United States Patent [19]

Ringel

[11] 4,300,775
[45] Nov. 17, 1981

[54] LIQUID-FILLED RADIAL SEAL

[75] Inventor: Reginald K. Ringel, Decatur, Ill.

[73] Assignee: Caterpillar Tractor Co., Peoria, Ill.

[21] Appl. No.: 93,071

[22] PCT Filed: Aug. 13, 1979

[86] PCT No.: PCT/US79/00594
§ 371 Date: Aug. 13, 1979
§ 102(e) Date: Aug. 13, 1979

[51] Int. Cl.³ .............................................. F16J 15/46
[52] U.S. Cl. ..................................... 277/34.3; 277/226
[58] Field of Search ............... 277/135, 34.3, 34, 34.6, 277/226

[56] References Cited

U.S. PATENT DOCUMENTS

| | | |
|---|---|---|
| 2,099,722 | 11/1937 | Byers . |
| 2,647,778 | 8/1953 | Shields ................................. 277/226 |
| 3,074,129 | 1/1963 | Peterson . |
| 3,149,848 | 9/1964 | Galloway . |
| 3,330,563 | 7/1967 | De Putdt et al. . |
| 3,385,604 | 5/1968 | Traufler . |
| 3,520,543 | 7/1970 | Etter et al. . |
| 3,642,291 | 2/1972 | Zeffer et al. . |
| 3,642,295 | 2/1972 | Cohen . |
| 3,788,651 | 1/1974 | Brown . |

FOREIGN PATENT DOCUMENTS

| | | | |
|---|---|---|---|
| 1472122 | 1/1967 | France | 277/226 |
| 537748 | 7/1956 | Italy . | |
| 141357 | 3/1961 | U.S.S.R. | 277/226 |

*Primary Examiner*—Robert I. Smith
*Attorney, Agent, or Firm*—Charles E. Lanchantin, Jr.

[57] ABSTRACT

A liquid-filled radial seal (12) includes an annular seal portion (36) and an annular body portion (34) connected thereto and defining an internal chamber (44) with an incompressible liquid (56) therein. The seal portion (36) has a sealing surface (64) and a cross sectional configuration tapering divergingly away from the sealing surface (64) to a cylindrical reference boundary (38) located between the portions (34,36). The chamber is spaced radially away from the reference boundary (38) and the free radial distance between the chamber (44) and the sealing surface (64) is preferably a preselected proportion of the overall radial height of the seal.

13 Claims, 6 Drawing Figures

(COMPRESSED)

(EXTENDED)

LIQUID-FILLED RADIAL SEAL

DESCRIPTION

1. Technical Field

The present invention relates to a self-adjusting, liquid-filled radial seal particularly adapted for effective sealing under eccentric loading conditions.

2. Background Art

Sealing radially between relatively rotatable cylindrical and tubular members is difficult when eccentricity exists to a significant degree. This general problem becomes harder to solve when the environment of the members places other requirements on the required operating parameters of the seal.

For example, the annular oil and dirt seal located between the cylindrical bore of the rockable motor grader tandem housing and the stationary support shaft is a particularly demanding application. A combination of tolerance stack-up and bearing deflection and wear creates a relatively large eccentric gap during radial loading. This requires that effective sealing must take place with one radial portion being under high compression and with the diametrically opposite portion being extended a substantially equal amount. Seals such as conventional O-rings which are frequently disposed in annular grooves have not performed as adequately as desired in this application because they have not been able to accommodate to these eccentric conditions.

One inflatable tubular seal is known which has a thin-walled outer cross section such that it would have a tendency to be damaged by rollover during axial assembly. thereof in a bore, for example. Moreover, the thin and weak walls thereof lower the face loading to an undesirable degree, or make the face load less predictable and less uniform than desired.

An ideal seal for the aforementioned joints must be able to self-adjust to relatively significant eccentric gaps. In addition, the seal should have a relatively low coefficient of friction at the region of the sliding interface with the cylindrical surface. Still further, the seal should be capable of easy insertion within a receiving annular groove in a first member and capable of axial assembly with respect to the cylindrical sealing surface of the cooperating second member without damage or rollover.

DISCLOSURE OF INVENTION

In accordance with one aspect of the present invention a liquid-filled radial seal is provided having an annular body portion and an annular seal portion connected along a cylindrical reference boundary. An internal chamber is defined in the body portion and an incompressible liquid is disposed therein. A substantially cylindrical seating surface is defined by the body portion and a substantially cylindrical sealing surface is defined by the seal portion. The seal portion has a cross section tapering divergingly away from the sealing surface toward the reference boundary, and a free radial distance "h" defined between the chamber and the sealing surface is proportioned within a range of about 25 to 50% of the free overall height "H" between the cylindrical surfaces.

Advantageously, the liquid-filled seal of the present invention can be filled with water or an ethylene glycol and water mix, and be disposed within a groove of a first member for radial sealing engagement with a cylindrical surface of a second member, and the significant thickness "h" between the sealing surface and the internal chamber allows better accommodation of the seal to a relatively significant eccentric gap between the first and second members.

BEST MODE FOR CARRYING OUT THE INVENTION

Figure 1:
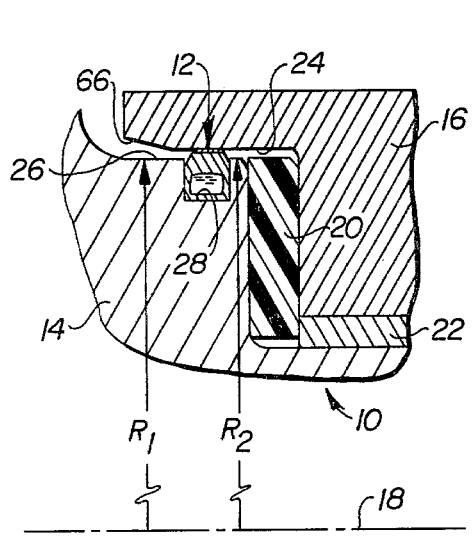
FIG. 1 is a diagrammatic, fragmentary cross sectional view of a radial seal constructed in accordance with the present invention and disposed in an annular groove between two annular members.

In the embodiment of the invention illustrated in FIGS. 1–4, a seal assembly 10 is shown to include a liquid-filled radial seal 12 disposed between two relatively movable members 14 and 16. The first member or stationary shaft 14 supports the second member or motor grader tandem housing 16 for limited rotation about a central axis 18. Suitable thrust washers 20, one shown, and a cylindrical tubular bearing element 22 serve to limit axial and radial movement of the housing on the shaft during operation of the motor grader over rough terrain for example.

Figure 3:
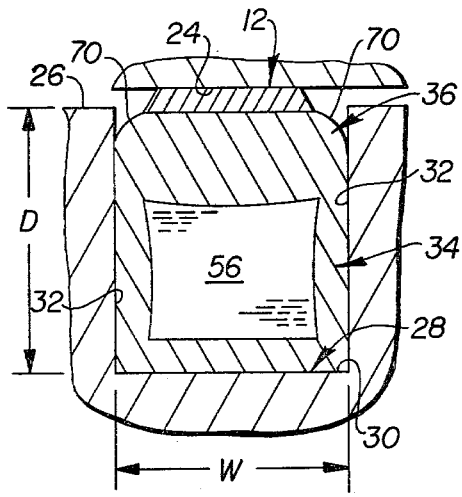
FIG. 3 is an enlarged, diagrammatic, cross sectional view of the seal region shown in FIG. 1, illustrating a condition of maximum eccentric radial compression of the seal.

The tandem housing 16 has a cylindrical internal surface or bore 24, and the shaft 14 has a cylindrical external surface 26 in which is defined an annular groove 28. As best shown in FIG. 3, the groove is defined by a bottom or cylindrical surface 30 concentric with the central axis 18 and a pair of facing sidewall surfaces 32 which are preferably planar in section and oriented normal to the central axis. Thus, the groove has a width W and a radial depth "D" as is illustrated in the drawing, and the radial distance between the juxtaposed surfaces 24,26 may be referred to as the radial gap. Advantageously, the radial seal 12 is seated in the groove and is adapted to self-adjustably and sealingly engage against the internal surface 24 despite variations in eccentricity of the surfaces 24,26 due to wear and deflection of the elements in use.

Figure 2:
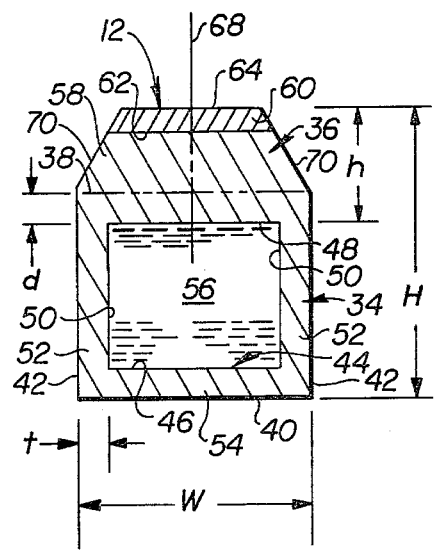
FIG. 2 is an enlarged, diagrammatic cross sectional view of the radial seal illustrated in FIG. 1 in a free state.

Referring now to FIG. 2, the radial seal 12 may be noted to include an annular body portion 34 and an annular seal portion 36 integrally connected together along a cylindrical reference boundary or theoretical line of demarcation 38. The body portion is preferably rectangular in cross sectional configuration and is defined by a bottom or cylindrical surface 40, a pair of planar sidewall surfaces 42 normal to the central axis 18 or normal to the bottom in the sectional view, and the cylindrical reference boundary. The body portion has an internal chamber 44 which in the free state of the seal is also preferably rectangular in cross sectional configuration, such as being defined by inner and outer cylindrical wall surfaces 46,48 and a pair of planar sidewall surfaces 50. The outer wall surface 48 of the chamber is preferably spaced a preselected distance "d" radial away from the reference boundary 38 so as to not interfere with the radial floating action of the thicker seal portion 36 and to assure positive assembly of the seal without damage. Moreover, the chamber is preferably symmetrically centered and so located as to define a pair of flexible sidewalls 52 and a bottom wall 54 of substantially the same thickness.

Advantageously, an incompressible liquid 56 is disposed in the internal chamber 44 of the body portion 34 of the seal 12. Preferably, the chamber is substantially completely filled with a liquid that would retain its fluidity over an operating temperature range of about −45° to 120° C. (−50° to 250° F.) and that would be compatible with the material composition of the seal. A preferred liquid is a mixture of water and ethylene glycol, with the ethylene glycol being about 55 Wt. % of the total mix. Alternately, plain water would be useful from about 0° to 100° C. (32° to 212° F.) and some silicone fluids would be useful from about −130° to 260° C. (−200° to 500° F.).

The seal portion 36 of the seal 12 illustrated in FIGS. 1-4 includes first and second elements 58 and 60 of different materials. The first element 58 is preferably made of an elastomeric, rubber or plastic material and is preferably an integral part of the body portion 34 or of common composition. I contemplate using a resilient composition for the first element 58 selected from the group consisting of nitrile rubber, natural rubber, chloroprene resin, or urethane materials. A preferred common composition is nitrile rubber having a hardness of about 60 on the Durometer A scale. The second element 60 is bonded or otherwise secured to the first element along a cylindrical joint 62, and has a cylindrical sealing surface 64 which in use contacts the cylindrical internal surface 24 of the tandem housing 16. The second element is preferably constructed of a relatively low friction material, for example having a coefficient of friction of less than 0.15 and preferably less than 0.10, in order to decrease wear and for ease of axial insertion of the seal into the bore 24 during initial assembly thereof. A conically tapered inlet surface 66 also serves to ease axial insertion of the seal into the bore. I contemplate using a low friction material for the second element 60 selected from the group consisting of polytetrafluoroethylene polymer, ultra high molecular weight polyethylene, acetal resins, and filled nylon. I further contemplate that polytetraflyoroethylene polymer particles can be impregnated or distributed in the material of the seal portion 36 around the periphery thereof adjacent the sealing surface 64. Such an impregnated material will also lower the friction coefficient and any heat buildup due to rubbing action of the sealing surface against the metal internal surface 24.

In the free state of the seal 12 shown in FIG. 2, the cross sectional configuration of the seal portion 36 may be noted to be a symmetrical quadrilateral or to be symmetrically tapered with respect to a center or midplane 68 normal to the axis 18. Specifically, the seal portion has oppositely inclined side surfaces or conical side surface portions 70 which taper divergingly away from the axial ends of the sealing surface 64 to terminate at points of contact with the reference boundary 38 and intersection of the sidewall surfaces 42 of the body portion 34.

INDUSTRIAL APPLICABILITY

Upon viewing FIG. 2 it will be noted that the free radial distance "h" defined between the chamber 44 and the sealing surface 64 is considerably larger than the relatively uniform thickness "t" of the walls 52 and 54. Particularly, for optimum operation, I contemplate that the distance "h" should preferably be proportioned in a range of about 25 to 50% of the free radial overall height "H" of the seal 12. This relatively thick cross sectional construction of primarily the seal portion 36 is sufficient to maintain the sealing surface 64 in a substantially cylindrical condition in response to eccentric movement of the juxtaposed surfaces 24, 26 shown in FIG. 1. Moreover, I contemplate that the thickness "t" should be proportioned in a range of about 10 to 20% of the axial width "W" of the seal. This provides relatively thin sidewalls 52 for optimum flexing movement.

The radial seal 12 is preferably made by extruding it through a die, cutting it into preselected lengths, suitably bonding or otherwise connecting the ends to each other to form an annular ring having a preselected inner diameter, and substantially filling the internal chamber 44 with the incompressible liquid 56. The seal needs to stretch diametrically about twice the depth D of the groove 28 over the surface 26 before it can snap in place into the groove, and this stretching action can be aided by utilizing conical service tools to gradually expand the ring as it is moved axially in a conventional manner. The inside diameter of the internal surface 40 of the seal is preferably smaller than the outside diameter of the bottom 30 of the groove. For example, I prefer a diametral stretch of about 0 to 5%. The tapered inlet surface or leading chamfer 66 of the bore 24 causes the seal to be radially compressed between the surfaces 24,26 as the tandem housing 16 and shaft 14 are moved axially together from about 0 to 15 percent nominal. With such construction the sealing face load at the surface 64 can be in a range of about 8 to 18 Newtons per lineal cm (5 to 10 pounds per lineal inch) of the circumference.

Since the seal portion 36 has a fairly stiff radial section that acts as a spring, the pressure of the sealing surface 64 is more predictable than prior art seal constructions. Furthermore, it tends to stabilize that part of the seal portion which extends outwardly beyond the confines of the groove 28 so that it does not rotate about the center of the cross section to the point of the resilient material rolling over the edges of the groove during axial assembly of the seal into a bore. In marked contrast, conventional tubular seals of the type having a uniform wall thickness can easily be damaged by such edge rollover during assembly.

The polygonal cross sectional shape of the body portion 34 is sized to closely fit the groove 28, and as an even radial pressure is applied to the sealing surface 64 the section in contact with the groove walls 32 becomes substantially incompressible. The seal portion 36, with side surfaces 70 free to expand, then forms the spring for the seal which applies sealing pressure against the mating surface 24.

Figure 4:
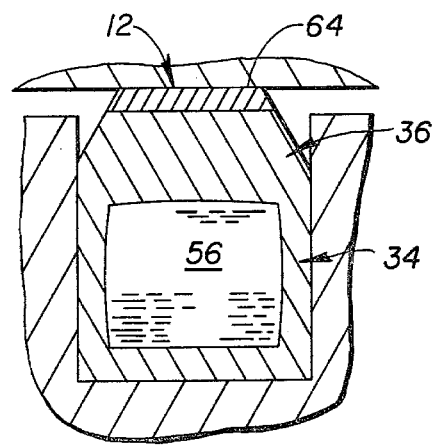
FIG. 4 is a view similar to FIG. 3, only illustrating a condition of maximum eccentric radial extension of the seal.

In an ideal situation the gap between the surface 24 and 26 would be equal about the circumference of the seal. But even though in actual use some eccentricity is experienced, the volume of the gap will tend to remain unchanged. The liquid 56 in the seal will thus flow from areas of high pressure to areas of low pressure until the volume is filled and the pressure of the liquid is equal around the annular chamber 44. The relatively thin side walls 52 will allow contraction and expansion of the seal as it is compressed on one side as is illustrated in FIG. 3 and expanded diametrically on the other side as is illustrated in FIG. 4. Thus, the seal compensates for eccentricity through automatic height adjustment.

Advantageously, because the thicker seal portion 36 serves mainly as a spring and the body portion 34 serves mainly as a compensator for the eccentricity the seal 12 will perform in a superior manner to prior art seals. The liquid 56 in the seal must not be higher than the sidewalls 32 of the groove to assure that the seal and the body portions carry out their substantially separate functions effectively.

Figure 5:
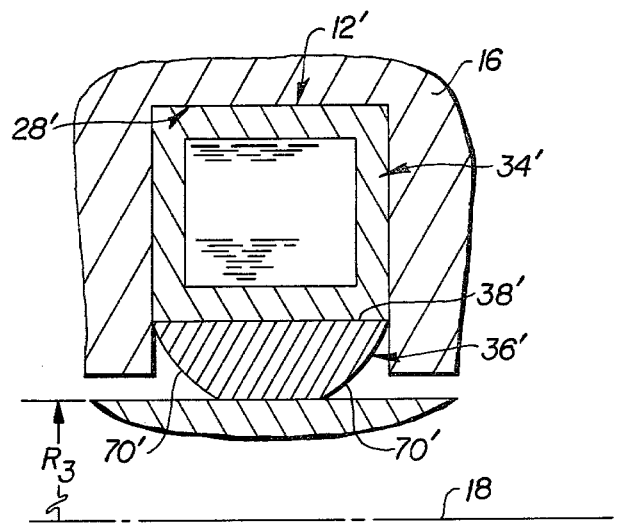
FIG. 5 is a view similar to FIGS. 3 and 4 of an alternate embodiment radial seal disposed in an internal groove between two annular members and constructed in accordance with the present invention.

Referring now to FIG. 5, an alternate embodiment radial seal 12' is shown with elements comparable to FIGS. 1-4 being identified by similar reference numerals having a prime indicator. It differs from the previously described embodiment as follows:

a. the body portion 34' is of one material and the seal portion 36' is of another relatively low friction material;

b. the body and seal portions 34', 36' are suitably bonded or connected together along the cylindrical reference boundary 38';

c. the side surfaces 70' are arcuate in cross section; and d. the groove 28' is an internal groove in the member 16 rather than being an external groove, and the seal 12' is constructed accordingly such that the seal portion 36' is on the inside diameter thereof facing the axis 18.

Figure 6:
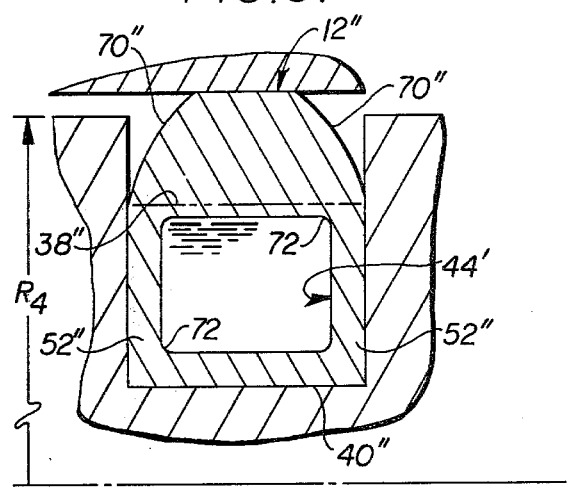
FIG. 6 is a view similar to FIGS. 3–5 only showing a second alternate embodiment radial seal.

FIG. 6 shows another alternate embodiment radial seal 12" which differs from the embodiment of FIGS. 1-4 by being of one common material throughout, having side surfaces 70" of proportionately greater radial extent, and having radially blended internal corners 72 within the chamber 44". However, the sidewalls 52" are desirably still relatively thin and of uniform thickness for a preselected radial distance for controlled flexing purposes.

Thus, it may be appreciated that the alternate embodiment seals 12' and 12" have substantially similar cross sectional shapes and modes of operation as that of the radial seal 12 described in detail, and that such variations are within the spirit of the present invention.

Other aspects, objects and advantages will become apparent from a study of the specification, drawings and appended claims.

I claim:

1. A liquid-filled radial seal (12) comprising:
   an annular body portion (34) having a substantially cylindrical seating surface (40) and defining an internal chamber (44);
   an incompressible liquid (56) substantially filling the chamber (44); and
   an annular seal portion (36) having a substantially cylindrical sealing surface (64), the seal portion (36) being radially connected to the body portion (34) along a cylindrical reference boundary (38) and having a cross sectional configuration tapering divergingly and radially away from the sealing surface (64) toward the reference boundary (38), the free radial distance "h" between the chamber (44) and the sealing surface (64) being proportioned within a range of about 25 to 50% of the free radial overall height "H" of the seal (12) between the cylindrical surfaces (40,64).

2. The seal (12) of claim 1 wherein the chamber (44) defines a pair of sidewalls (52) having substantially parallel inner and outer surfaces (50, 42), each sidewall having a thickness "t" proportioned in a range of about 10 to 20% of the axial width "w" of the seal.

3. The seal (12) of claim 1 wherein the sealing surface (64) has a coefficient of friction less than 0.15.

4. The seal (12) of claim 1 wherein in the free state the body portion (34) is a symmetrical quadrilateral in cross sectional configuration.

5. The seal (12) of claim 1 wherein the seal portion (36) tapers divergingly away from the sealing surface (64) solely to the reference boundary (38) in a symmetrical manner in the cross sectional configuration.

6. The seal (12) of claim 5 wherein the chamber (44) is located radially inwardly and away from the reference boundary (38).

7. The seal (12) of claim 1 wherein in the free state the seal portion (36) is a symmetrical trapezoid in cross sectional configuration.

8. The seal (12) of claim 1 wherein the seal portion (36) has first and second elements (58,60) connected together, the second element (60) defining the sealing surface (64) and being constructed of a relatively low friction material, the first element (58) being constructed of an elastomeric material different than the relatively low friction material.

9. The seal (12) of claim 1 wherein the liquid (56) includes water and ethylene glycol.

10. The seal (12) of claim 1 wherein in the free state the seal portion (36) has opposite conical side surface portions (70).

11. The seal (12) of claim 1 wherein the material of the body portion (34) is selected from the group consisting of nitrile rubber, natural rubber, chloroprene rubber, and urethane materials.

12. The seal (12) of claim 11 wherein the sealing surface (64) thereof is of a material selected from the group consisting of polytetrafluoroethylene polymer, ultra high molecular weight polyethylene, acetal resin, and filled nylon.

13. The seal (12) of claim 1 wherein in the free state the internal chamber (44) is generally of rectangular cross sectional configuration.

* * * * *